United States Patent
Schneider

(10) Patent No.: US 10,046,908 B2
(45) Date of Patent: Aug. 14, 2018

(54) COLLAPSIBLE CONTAINMENT BAG

(71) Applicant: Steve J. Schneider, Decatur, GA (US)

(72) Inventor: Steve J. Schneider, Decatur, GA (US)

(73) Assignee: MATERIAL MOTION, INC., Decatur, GA (US)

( * ) Notice: Subject to any disclaimer, the term of this patent is extended or adjusted under 35 U.S.C. 154(b) by 100 days.

(21) Appl. No.: 15/001,536

(22) Filed: Jan. 20, 2016

(65) Prior Publication Data

US 2016/0207704 A1 Jul. 21, 2016

Related U.S. Application Data

(60) Provisional application No. 62/106,016, filed on Jan. 21, 2015.

(51) Int. Cl.
| | |
|---|---|
| *B65D 90/24* | (2006.01) |
| *B65D 6/18* | (2006.01) |
| *B65D 57/00* | (2006.01) |
| *B65D 88/52* | (2006.01) |
| *B65D 5/36* | (2006.01) |
| *B65D 37/00* | (2006.01) |
| *F01M 11/00* | (2006.01) |
| *F16N 31/00* | (2006.01) |

(Continued)

(52) U.S. Cl.
CPC ........... *B65D 90/24* (2013.01); *B65D 5/3607* (2013.01); *B65D 11/184* (2013.01); *B65D 11/186* (2013.01); *B65D 11/1853* (2013.01); *B65D 37/00* (2013.01); *B65D 57/00* (2013.01); *B65D 88/522* (2013.01); *B65D 88/524* (2013.01); *F01M 11/0004* (2013.01); *F16N 31/006* (2013.01); *B65D 88/1606* (2013.01); *B65D 88/1631* (2013.01); *D06F 95/002* (2013.01)

(58) Field of Classification Search
CPC .... B65D 90/24; B65D 11/186; B65D 11/184; B65D 11/1853; B65D 88/522; B65D 88/524; B65D 35/3642; B65D 5/3635; B65D 5/3678; B65D 5/3628; B65D 88/1606; B65D 88/1631; B65D 37/00; B65D 57/00; B65D 5/3621; B65D 5/3607; B65F 1/1415
USPC .......................................... 220/9.4, 4.28, 666
See application file for complete search history.

(56) References Cited

U.S. PATENT DOCUMENTS

| | | | |
|---|---|---|---|
| 2,749,956 A * | 6/1956 | Eldred ................. | B65D 88/522 220/565 |
| 3,684,155 A * | 8/1972 | Smith .................. | A01K 1/0125 119/168 |

(Continued)

*Primary Examiner* — Andrew T Kirsch
*Assistant Examiner* — Jennifer Castriotta
(74) *Attorney, Agent, or Firm* — Thomas Horstemeyer, LLP

(57) ABSTRACT

Disclosed are various embodiments of a collapsible containment bag configured to retain a collection of hazardous materials. In one embodiment, the containment bag includes a non-porous liner, a plastic sheeting, and a bag frame. The containment bag may be in a collapsed state initially and later expand for use at the site of an environmental spill. The containment bag may be expanded from the collapsed state through a series of actions that may include pivoting a portion of the containment bag about an edge and pulling opposing sides of the containment bag away from the center of the containment bag.

19 Claims, 6 Drawing Sheets

(51) Int. Cl.
 *B65D 88/16* (2006.01)
 *D06F 95/00* (2006.01)

(56) References Cited

U.S. PATENT DOCUMENTS

| | | | | |
|---|---|---|---|---|
| 5,551,106 A * | 9/1996 | Schacht | ............... | A47D 13/063 5/99.1 |
| 6,948,632 B2 * | 9/2005 | Kellogg | ................ | D06F 95/004 135/125 |
| 6,953,127 B1 * | 10/2005 | Esser | .................... | B65D 90/24 220/23.91 |
| 7,337,914 B2 * | 3/2008 | Spindel | .................. | B65D 9/14 206/508 |
| 2006/0175328 A1 * | 8/2006 | Lapoint, III | ......... | B65D 5/3628 220/6 |
| 2010/0140263 A1 * | 6/2010 | Claeys | ................ | B65D 90/205 220/9.3 |
| 2012/0103981 A1 * | 5/2012 | Warren | ................ | B65F 1/1415 220/9.4 |
| 2013/0043241 A1 * | 2/2013 | Hunter | ................ | B65D 25/005 220/6 |
| 2013/0284734 A1 * | 10/2013 | Huang | ............... | B65D 11/1866 220/9.4 |

\* cited by examiner

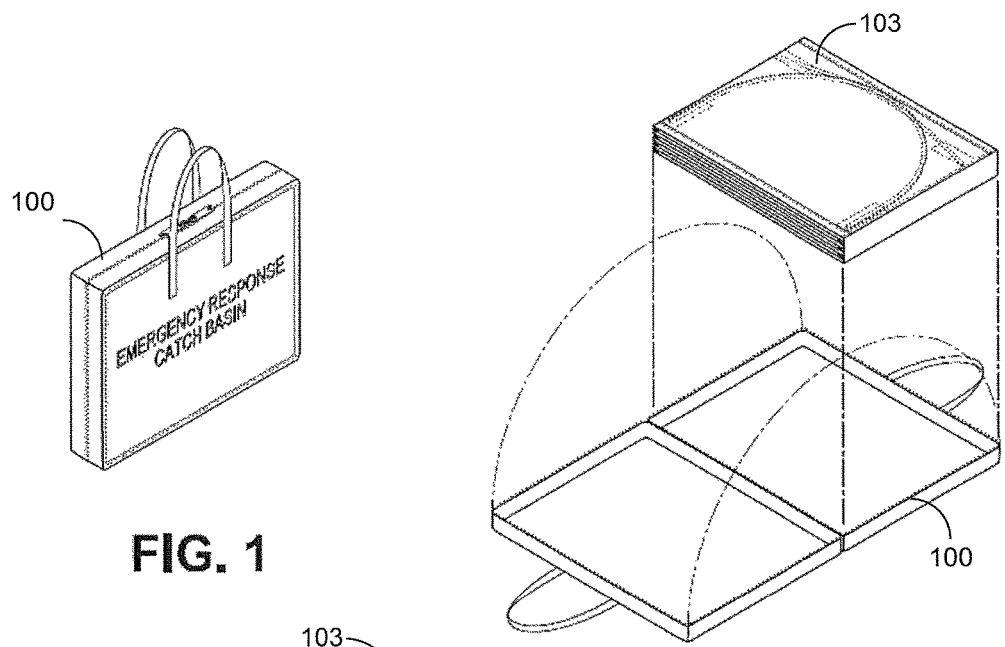
FIG. 1
FIG. 2
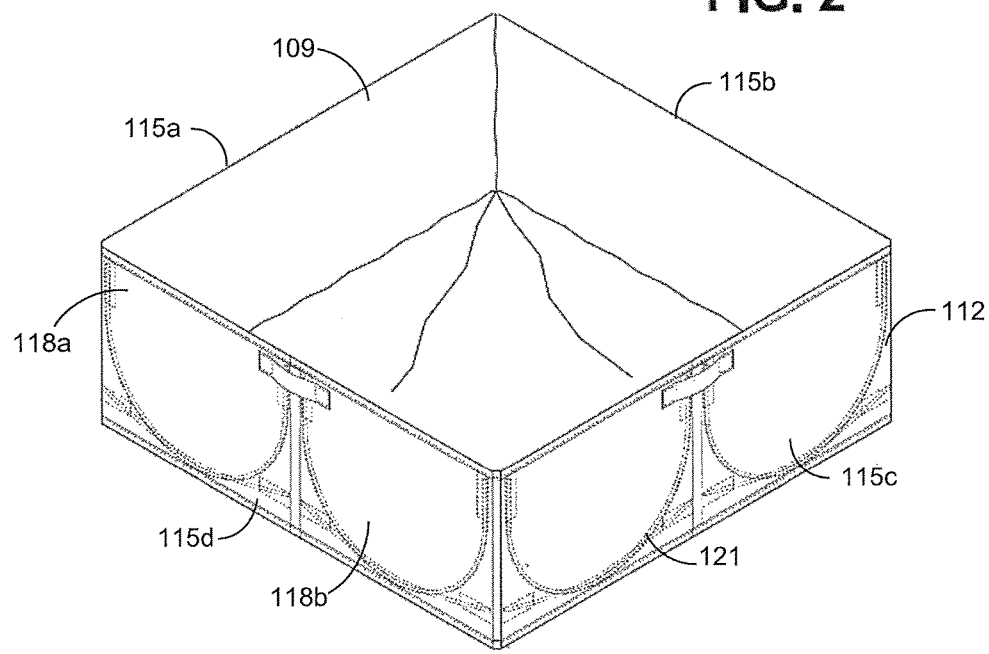
FIG. 3

COLLAPSIBLE CONTAINMENT BAG

CROSS REFERENCE TO RELATED APPLICATIONS

This application claims the benefit of, and priority to, U.S. Provisional Patent Application No. 62/106,016 entitled "COLLAPSIBLE CONTAINMENT BAG" filed on Jan. 21, 2015, which is incorporated herein by reference in its entirety.

BACKGROUND

Environmental containers may be used to contain hazardous materials at various locations, such as at maintenance shops, field locations, drilling sites for oil and gas wells, manufacturing facilities, warehouses, user facilities, etc. In this context, environmental containers may be brought to the location to prevent the spread of contaminants, such as spilled oil or gas, in the environment. These environmental containers may be rigid, heavy, and/or require particular handling equipment. As such, these containers may present transportation challenges based on their quantity, size, shape, and weight. The speed at which containers may be deployed on location may assist in reducing the environmental impact of the spill and reduce remediation costs.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1 illustrates an example of a containment bag case according to various embodiments of the present disclosure.

FIG. 2 illustrates the containment bag case of FIG. 1 and a containment bag in a collapsed state according to various embodiments of the present disclosure.

FIG. 3 illustrates the containment bag in FIG. 2 in an expanded state according to various embodiments of the present disclosure.

DETAILED DESCRIPTION

Figure 4:
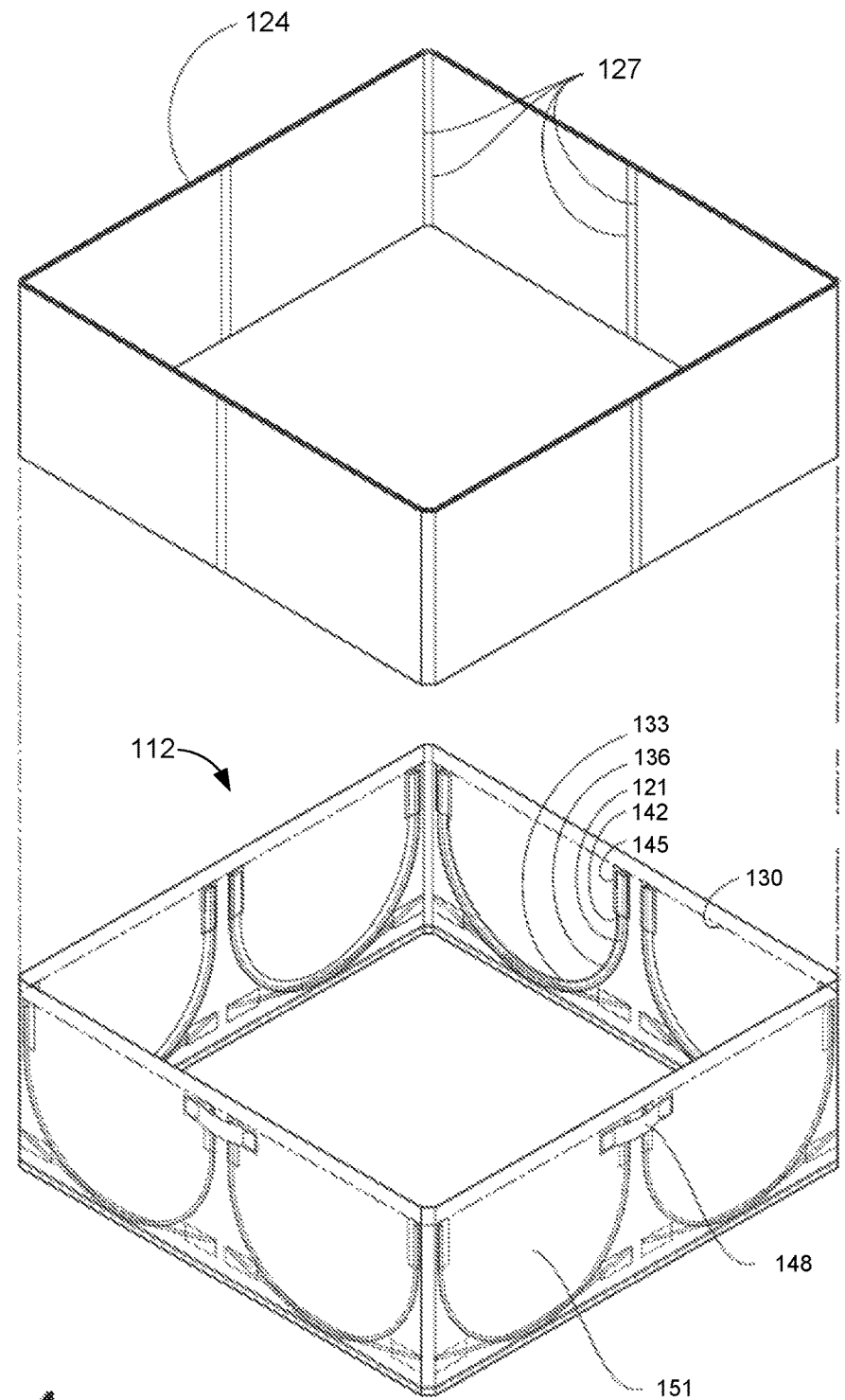
FIG. 4 illustrates a bag frame and a corrugated double walled plastic sheeting for the containment bag of FIG. 3 according to various embodiments of the present disclosure.

The present disclosure relates to a collapsible containment bag that may be used to retain hazardous materials. Businesses may use hazardous materials at various job locations, such as at maintenance shops, field locations, drilling sites for oil and gas wells, manufacturing facilities, warehouses, user facilities, etc. Spills of hazardous materials may occur due to improper handling of materials, equipment malfunctions, or operator error. In the event that a spill of a hazardous material occurs, on-site personnel may initiate efforts to address the source of the spill and start a clean-up process. The remediation costs may increase as more time is taken to address the source of the spill and clean-up any damage. Thus, in some scenarios, a spill of hazardous materials may trigger an emergency response by the on-site operators to quickly address the source of the spill and begin clean-up efforts immediately. Accordingly, on-site operators or response teams sent to the job location may use portable environmental containers, such as the collapsible containment bag described herein, to assist with the containment and clean-up of spills.

With reference to FIG. 1, shown is an example of a containment bag case 100. According to the embodiment shown in FIG. 1, the containment bag case 100 comprises a first side and second side. The first and second sides may be hingedly connected along one edge.

The containment bag case 100 may also comprise a fastening mechanism, such as a zipper, and a pair of handles. The fastening mechanism may removably attach the first side of the containment bag case 100 to the second side of the containment bag case 100 along one or more edges. As shown in FIG. 1, a first handle may be attached to the first side of the containment bag case 100, and a second handle may be attached to the second side of the containment bag case 100.

With reference to FIG. 2, shown is the containment bag case 100 in an opened state. The containment bag case 100 may be opened by manipulating the fastening mechanism by, for example, unzipping a zipper, and then pivoting the first side of the containment bag case 100 away from the second side of the containment bag 100 along the edge that connects the first side to the second sides.

In addition, FIG. 2 shows a containment bag 103 that has been removed from the containment bag case 100. In FIG. 2, the containment bag 103 is shown in a collapsed state.

With reference to FIG. 3, shown is a perspective view of the containment bag 103 in FIG. 2 in an expanded state. The containment bag 103 may comprise a non-porous liner 109 and a bag frame 112 that provides support for the non-porous liner 109. In some embodiments, the non-porous liner 109 may be positioned over the bag frame 112 so that the non-porous liner 109 covers the bag frame 112.

The bag frame 112 in conjunction with the non-porous liner 109 form four vertical sides 115a-d. Each vertical side 115 may be hingedly connected to two other vertical sides 115 as shown. Additionally, each of the vertical sides 115 may comprise at least two panels 118a-b, which are hingedly connected along a vertical edge as shown. Each of the at least two panels 118 may comprise a curved support structure 121, such as a wire spring.

Next, a general description of the operation of the various components of the containment bag 103 is provided. As described above, in the event of an environmental spill, a response team may be deployed to repair the source of the environmental spill and immediately begin a clean-up process. The containment bag 103 may be transported in the containment bag case 100 to a particular location. After arriving at the environmental spill location, the containment bag case 100 may be unzipped, and the containment bag case 100 may be opened to the state in FIG. 2.

Thereafter, the containment bag 103 may be removed from the containment bag case 100. The containment bag 103 may be expanded through a progression of actions, such as pivoting some of the panels 118 along an edge and pulling opposing vertical sides 115 in opposite directions away from the center of the containment bag 103. Once fully expanded, the containment bag 103 may be positioned to, for example, catch an oil leak or any other type of hazardous material. After the containment bag 103 has collected the hazardous material, the hazardous material may be removed from the containment bag 103.

After the oil has been removed from the containment bag 103, the containment bag 103 may be collapsed back to the collapsed state illustrated in FIG. 2.

With reference to FIG. 4, shown is the bag frame 112 and a corrugated double walled plastic sheeting 124 for the containment bag 103 of FIG. 3. The corrugated double walled plastic sheeting 124 may comprise of vertical fold lines 127 and internal vertical ribbing.

In addition, the bag frame 112 may comprise a horizontal fold line 130, wire spring sheath stitching 133, a wire spring sheath 136, a curved support structure 121, such as a wire spring, a pocket opening 142, a wire spring and sheath pocket 145, a bag handle 148, and woven outer material 151. The wire spring may be used to support the vertical sides 115a-d of the bag frame 112. The wire spring may be located in the wire spring sheath 136. The ends of the wire spring may be contained in the wire spring and sheath pocket 145. The ends of the wire spring may be inserted into a lower end of the wire spring and sheath pocket 145 via the pocket opening 142.

As shown in FIG. 4, the woven outer material 151 may be connected to the wire spring sheath 136 and the wire spring and sheath pocket 145 via the wire spring sheath stitching 133. The woven outer material 151 may also be connected to a handle on each vertical side 115. In FIG. 4, the bag handle 148 illustrates a handle on one vertical side 115.

Figure 5:
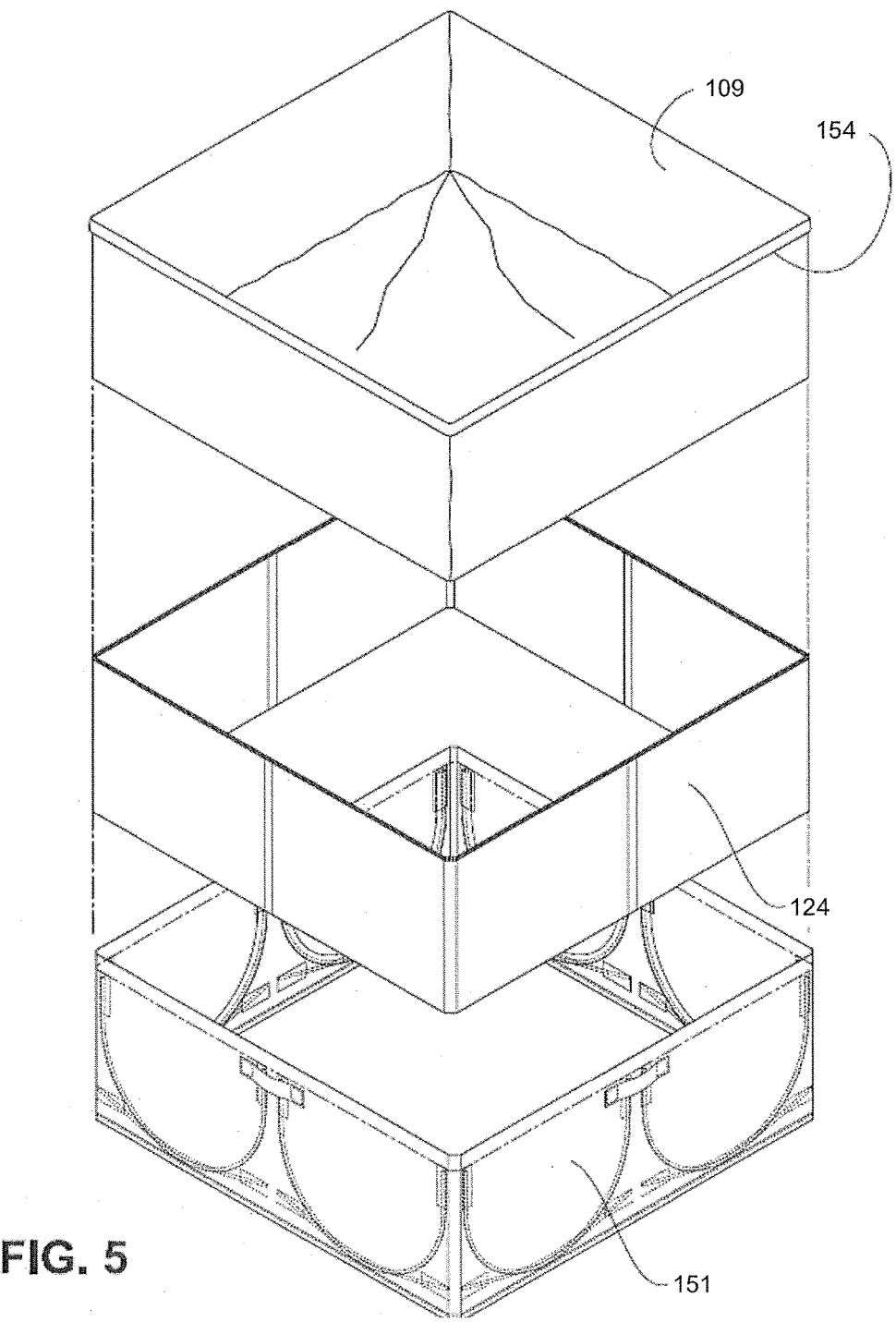
FIG. 5 illustrates the bag frame, the plastic sheeting, and a non-porous liner for the containment bag of FIG. 3 according to various embodiments of the present disclosure.

With reference to FIG. 5, shown is a perspective view of the bag frame 112, the plastic sheeting 124, and the non-porous liner 109 for the containment bag of FIG. 3. The non-porous liner 109 may comprise a turned down lip 154 sewn to the woven outer material 151.

Figure 6:
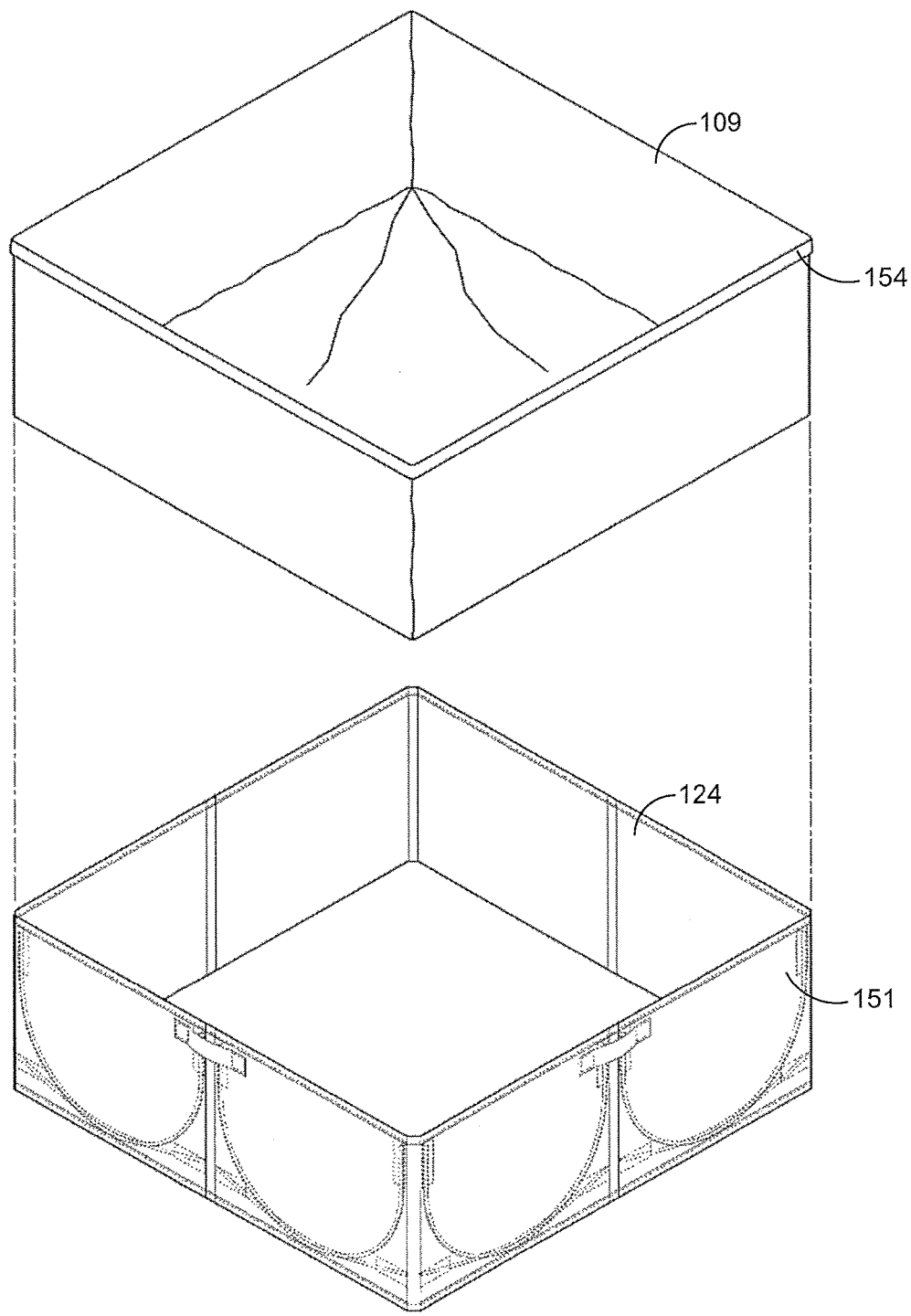
FIG. 6 illustrates the bag frame connected to the plastic sheeting and the non-porous liner according to various embodiments of the present disclosure.

With reference to FIG. 6, shown is a perspective view of the bag frame 112 connected to the plastic sheeting 124 and the non-porous liner 109.

Figure 7A:
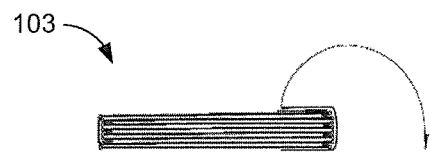
FIGS. 7A-7E illustrate an example progression of the containment bag in FIG. 3 expanding according to various embodiments of the present disclosure.
Figure 7B:
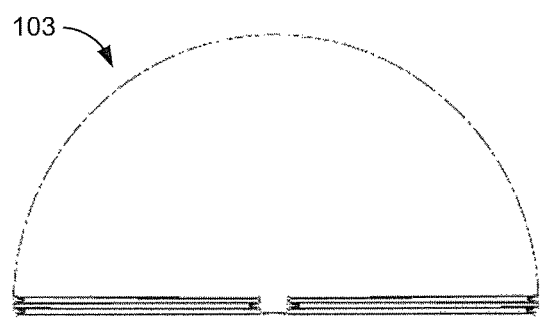
Figure 7C:
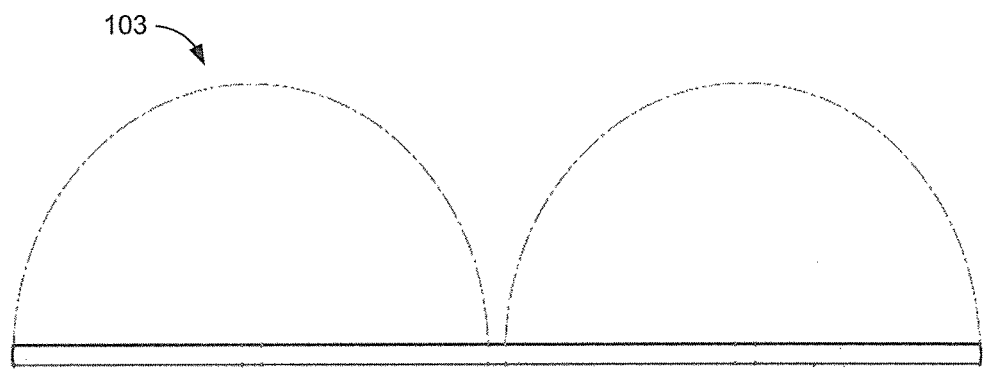
Figure 7D:
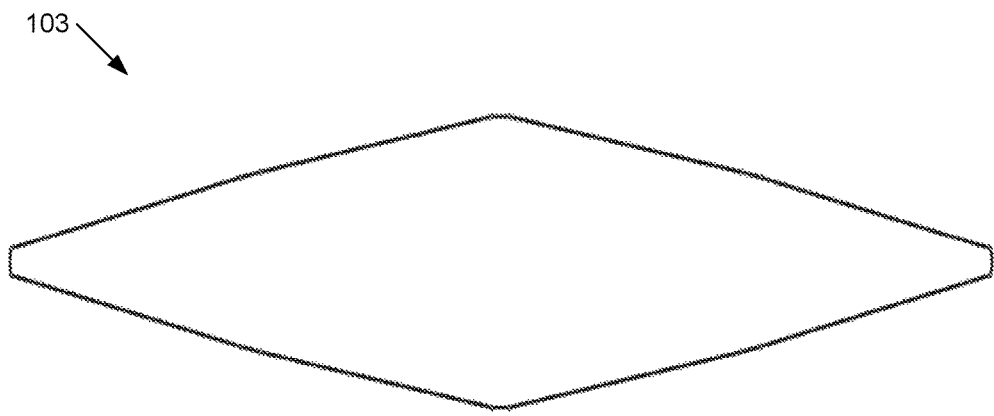
Figure 7E:
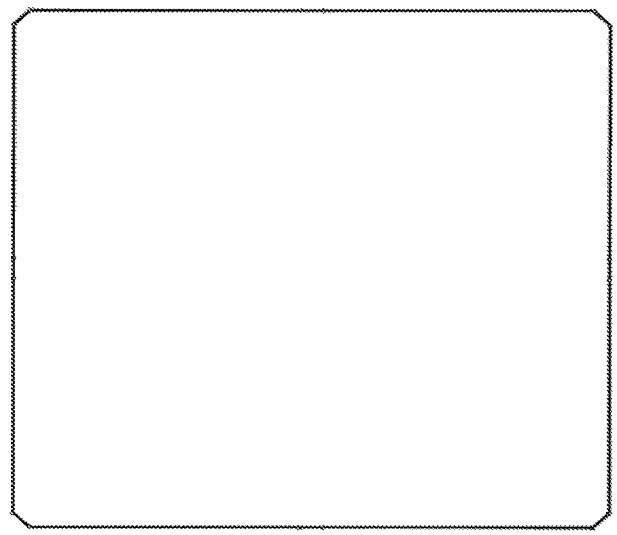

With reference to FIGS. 7A-7E, shown are example progressions of the containment bag 103 in FIG. 3 expanding. In particular, FIGS. 7A-7C show side views of the containment bag 103 being expanded, and FIGS. 7D-7E show top views of the containment bag 103 being expanded.

FIG. 7A shows the containment bag 103 in the collapsed state. In the collapsed state, the panels 118 of the containment bag 103 are stacked relative to each other. FIG. 7B illustrates that panels 118 of the containment bag 103 may be pivoted about an edge. In some embodiments, as shown in FIG. 7C, the panels 118 of the containment bag 103 may be pivoted again about an additional edge.

FIG. 7D shows a top view of the containment bag 103 being expanded. After some of the panels 118 of the containment bag 103 have been pivoted along respective edges, as shown in FIGS. 7B-C, the middle hinges of each vertical side 115 may move outward from a center position of the containment bag 103. This movement of the middle hinges may facilitate a pair of the panels 118 aligning to form the vertical side 115 of the containment bag 103. Alternatively, after a portion of the containment bag 103 has been pivoted along an edge, the containment bag 103 may be expanded by pulling two opposing vertical sides 115 in opposite directions away from the center of the containment bag 103. FIG. 7E illustrates an example top perspective view of the containment bag 103 in an expanded state.

It should be emphasized that the above-described embodiments of the present disclosure are merely possible examples of implementations to set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. An apparatus for containing liquid or solid materials, comprising:
    a bottom liner;
    a first side panel and a second side panel connected to the bottom liner;
    a front panel and a back panel connected to the bottom liner, the front panel and the back panel hingedly connected to the first side panel and the second side panel;
    wherein the apparatus is collapsible to a collapsed state by moving at least one of the first side panel, the second side panel, the front panel, or the back panel toward a center of the apparatus; and
    wherein at least one of the first side panel, the second side panel, the front panel, or the back panel further comprises a curved support structure with a first end and a second end, wherein the first end and the second end of the curved support structure are displaced a substantially equal distance from an edge of the at least one of the first side panel, the second side panel, the front panel, or the back panel.

2. The apparatus of claim 1, wherein the curved support structure is a wire spring.

3. The apparatus of claim 1, wherein the curved support structure is connected to at least one of the first side panel, the second side panel, the front panel, or the back panel by a sheath.

4. The apparatus of claim 1, wherein the first end of the curved support structure is contained in a first sheath pocket and a second end of the curved support structure is contained in a second sheath pocket.

5. The apparatus of claim 1, wherein the apparatus further comprises an outer surface that comprises a woven material.

6. The apparatus of claim 1, wherein, when the apparatus is in the collapsed state, the first side panel, the second side panel, the front panel, and the back panel are positioned in a stacked configuration.

7. The apparatus of claim 1, wherein the bottom liner comprises a non-porous material.

8. The apparatus of claim 7, wherein the non-porous material is configured to retain a collection of a hazardous material.

9. The apparatus of claim 1, further comprising a corrugated plastic sheeting connected to an interior surface area of the front panel, the back panel, the first side panel, and the second side panel.

10. The apparatus of claim 1, further comprising a handle connected to an exterior surface area of at least one of the front panel, the back panel, the first side panel, or the second side panel.

11. The apparatus of claim 1, further comprising a vertical hinge positioned at a center of at least one of the front panel, the back panel, the first side panel, or the second side panel.

12. The apparatus of claim 11, wherein the apparatus is collapsible to the collapsible state by folding the vertical hinge inward toward the center of the apparatus.

13. The apparatus of claim 1, wherein the curved support structure comprises a first curved support structure, wherein each of the first side panel, the second side panel, the front panel, and the back panel comprise the first curved support structure and a second curved support structure.

14. The apparatus of claim 1, wherein the curved support structure comprises a continuous U-shape.

15. The apparatus of claim 1, wherein the curved support structure is stitched to the at least one of the first side panel, the second side panel, the front panel, or the back panel.

16. The apparatus of claim 1, wherein the edge comprises a top edge, wherein the at least one of the first side panel, the second side panel, the front panel, or the back panel further comprises the top edge and a bottom edge.

17. The apparatus of claim 16, wherein the bottom edge connects to the bottom liner.

18. A method of expanding a containment bag, comprising:
pivoting a first plurality of panels away from a second plurality of panels along a first hinge and a second hinge, wherein the first hinge and the second hinge are connected to at least one of the first plurality of panels and at least one of the second plurality of panels;
forming a first side panel from one of the first plurality of panels and one of the second plurality of panels in response to pivoting the first plurality of panels away from the second plurality of panels;
forming a second side panel from another of the first plurality of panels and another of the second plurality of panels in response to pivoting the first plurality of panels away from the second plurality of panels;
manipulating the first side panel and the second side panel in opposing outward directions from a center of the containment bag, wherein a third side panel is formed and connected to the first side panel and the second side panel, wherein a fourth side panel is formed and connected to the first side panel and the second side panel; and
wherein at least one of the first side panel, the second side panel, the third panel, or the fourth side panel further comprises a curved support structure with a first end and a second end, wherein the first end and the second end of the curved support structure are displaced a substantially equal distance from an edge of the at least one of the first side panel, the second side panel, the third side panel, or the fourth side panel.

19. The method of claim 18, wherein the third side panel is formed by unfolding a third vertical hinge of the first plurality of panels and the fourth side panel is formed by unfolding a fourth vertical hinge of the second plurality of panels.

* * * * *